(12) United States Patent
Spetseris et al.

(10) Patent No.: US 8,926,875 B2
(45) Date of Patent: Jan. 6, 2015

(54) MANAGED PORE SIZE DISTRIBUTION IN HONEYCOMB SUBSTRATES

(75) Inventors: Mark Allen Spetseris, Pine City, NY (US); Balaji Venkatesan Swarnamani, Painted Post, NY (US); Conor J Walsh, Campbell, NY (US); Gregory N Yourkievitz, Wilmington, NC (US)

(73) Assignee: Corning Incorporated, Corning, NY (US)

( * ) Notice: Subject to any disclaimer, the term of this patent is extended or adjusted under 35 U.S.C. 154(b) by 496 days.

(21) Appl. No.: 13/059,837

(22) PCT Filed: Aug. 27, 2009

(86) PCT No.: PCT/US2009/004889
§ 371 (c)(1),
(2), (4) Date: Feb. 18, 2011

(87) PCT Pub. No.: WO2010/024915
PCT Pub. Date: Mar. 4, 2010

(65) Prior Publication Data
US 2011/0147971 A1    Jun. 23, 2011

Related U.S. Application Data

(60) Provisional application No. 61/092,518, filed on Aug. 28, 2008.

(51) Int. Cl.
| | | |
|---|---|---|
| *B28B 3/20* | (2006.01) | |
| *C04B 38/00* | (2006.01) | |
| *B01D 46/24* | (2006.01) | |
| *C04B 35/185* | (2006.01) | |
| *C04B 35/195* | (2006.01) | |
| *C04B 35/478* | (2006.01) | |
| *C04B 35/632* | (2006.01) | |
| *C04B 38/06* | (2006.01) | |
| *C04B 111/00* | (2006.01) | |

(52) U.S. Cl.
CPC .......... *B01D 46/2418* (2013.01); *C04B 35/185* (2013.01); *C04B 35/195* (2013.01);
(Continued)

(58) Field of Classification Search
CPC ................... B01D 46/2429; B01D 2046/2433; C04B 38/0009; C04B 38/06; C04B 38/007; C04B 38/0074
USPC ...................... 264/630, 631, 43, 44
See application file for complete search history.

(56) References Cited

U.S. PATENT DOCUMENTS 3,885,977 A    5/1975  Lachman et al.
4,483,944 A    11/1984 Day et al.
(Continued)

FOREIGN PATENT DOCUMENTS

| WO | 2004011386 A1 | 2/2004 |
| WO | 2005046840 A1 | 5/2005 |
| WO | 2006015240 A2 | 2/2006 |

OTHER PUBLICATIONS

CN200980133224.7 Notice of Second Office Action.

*Primary Examiner* — Erin Snelting
(74) *Attorney, Agent, or Firm* — Charles A. Greene; Walter M. Douglas

(57) ABSTRACT

The invention is directed to a method for managing pore size distribution in honeycomb substrates by using two or more pore forming agents in the batch ingredients. In particular, the invention is particularly useful in managing pore size distribution in cordierite and aluminum titanate honeycomb substrates in the face of particle size variations in the pore forming agents and other materials used to make such substrates.

15 Claims, 5 Drawing Sheets

(52) U.S. Cl.
CPC ............. *C04B 35/478* (2013.01); *C04B 35/632* (2013.01); *C04B 38/0006* (2013.01); *C04B 38/06* (2013.01); *B01D 46/2425* (2013.01); *B01D 2046/2433* (2013.01); *B01D 2046/2437* (2013.01); *B28B 3/20* (2013.01); *C04B 2111/00793* (2013.01); *C04B 2111/0081* (2013.01); *C04B 2235/96* (2013.01)
USPC .............................. 264/43; 264/630; 264/631

(56) References Cited

U.S. PATENT DOCUMENTS

| | | | |
|---|---|---|---|
| 4,855,265 A | 8/1989 | Day et al. | |
| 4,950,628 A | 8/1990 | Landon et al. | |
| 5,183,608 A | 2/1993 | Guile | |
| 5,258,150 A | 11/1993 | Merkel et al. | |
| 5,290,739 A | 3/1994 | Hickman | |
| 6,210,626 B1 | 4/2001 | Cornelius et al. | |
| 6,238,618 B1 | 5/2001 | Brundage et al. | |
| 6,319,870 B1 | 11/2001 | Beall et al. | |
| 6,368,992 B1 | 4/2002 | Beall et al. | |
| 6,432,856 B1 | 8/2002 | Beall et al. | |
| 6,620,751 B1 | 9/2003 | Ogunwumi | |
| 6,773,657 B2 | 8/2004 | Beall et al. | |
| 6,849,181 B2 | 2/2005 | Ogunwumi et al. | |
| 6,864,198 B2 | 3/2005 | Merkel | |
| 6,942,713 B2 | 9/2005 | Ogunwumi et al. | |
| RE38,888 E | 11/2005 | Beall et al. | |
| 7,001,861 B2 | 2/2006 | Beall et al. | |
| 7,259,120 B2 | 8/2007 | Ellison et al. | |
| 7,294,164 B2 | 11/2007 | Merkel | |
| 2004/0020846 A1 | 2/2004 | Ogunwumi et al. | |
| 2004/0029707 A1 | 2/2004 | Beall et al. | |
| 2004/0092381 A1 | 5/2004 | Beall et al. | |
| 2004/0261384 A1 | 12/2004 | Merkel et al. | |
| 2005/0046063 A1 | 3/2005 | Toda et al. | |
| 2007/0006561 A1* | 1/2007 | Brady et al. | 55/523 |

\* cited by examiner

MANAGED PORE SIZE DISTRIBUTION IN HONEYCOMB SUBSTRATES

CROSS-REFERENCE TO RELATED APPLICATIONS

This application claims the benefit of priority under 35 U.S.C. §119(e) of U.S. Provisional Application Ser. No. 61/092,518 filed on Aug. 28, 2008.

FIELD

This disclosure is directed to a method for managing pore size distribution in honeycomb substrates and filters by using two or more pore forming agents in the batch ingredients. In particular, the disclosure is particularly useful in managing pore size distribution in cordierite and aluminum titanate honeycomb substrates and filters in the face of particle size variations in the pore forming agents used to make such substrates.

BACKGROUND

Porosity in ceramic substrates can be augmented by the use of carbon based pore formers; for example, graphite and starch. Pore formers are used when conventional batching methods fail to generate the level of porosity that is desired for the product application. For cordierite and aluminum titanate honeycomb substrates with a base composition suitable for diesel particulate filters a typical porosity level is about 40%. Pore formers are used to raise the porosity to levels above the base level, typically in a range of 50% to 60%. Variation in materials over time can change the average pore size distribution in honeycomb substrates due to the changing attributes of the constituent batch materials. These changes can be due to differences in chemistries, morphologies, or particle sizes for one or more of the batched ingredients. It can be quite difficult or expensive to reduce this variation to the level where it does not have an impact on the resulting product pore size. Variability in the lot-to-lot porosity of honeycomb substrates, for example, diesel honeycomb filters, over time can lead to coating differences and changing pressure drop performance over time. Reducing the honeycomb variations in porosity over time will result in a more consistently performing product in downstream use. The present disclosure describes a method for controlling pore size distribution in porous ceramic honeycomb substrates through the use of two or more pore forming materials having different particle size distributions.

SUMMARY

In one aspect the disclosure is directed to a method for controlling the pore size in honeycomb substrates and filters, said method comprising batching selected ingredients suitable for forming a honeycomb substrate, forming a green body from said batch materials and firing said green body to form a honeycomb substrate; the batch contains a plurality of carbon based pore forming materials having different particle size distributions to control the pore size distribution in the honeycomb substrate, the selected pore forming materials being added to the batch in a selected ratio.

In various embodiments the method is directed to the formation of cellular ceramic ("honeycomb") substrates such as mullite, cordierite and aluminum titanate honeycombs and filters (a wall-flow device made from flow-through honeycombs by selectively plugging alternating honeycomb inlet and outlet channels to force inlet gases to flow through the walls of the honeycomb).

In various embodiments the pore forming materials are "carbon based" materials selected from the group consisting of graphite, activated carbon, a foamed resin (for example without limitation, an acrylic or acrylate bead), wheat flour, starch, a phenolic resin, and other pore forming agents known in the art that can advantageously be used. For example, graphite, activated carbon and starch, including, potato starch, are used as pore forming agents.

In one embodiment batch contains two pore formers of different particle size, said pore formers being graphite pore formers, one of said pore formers being a coarse particle size pore former and the other pore former being a finer particle size pore former.

DETAILED DESCRIPTION

Figure 1:
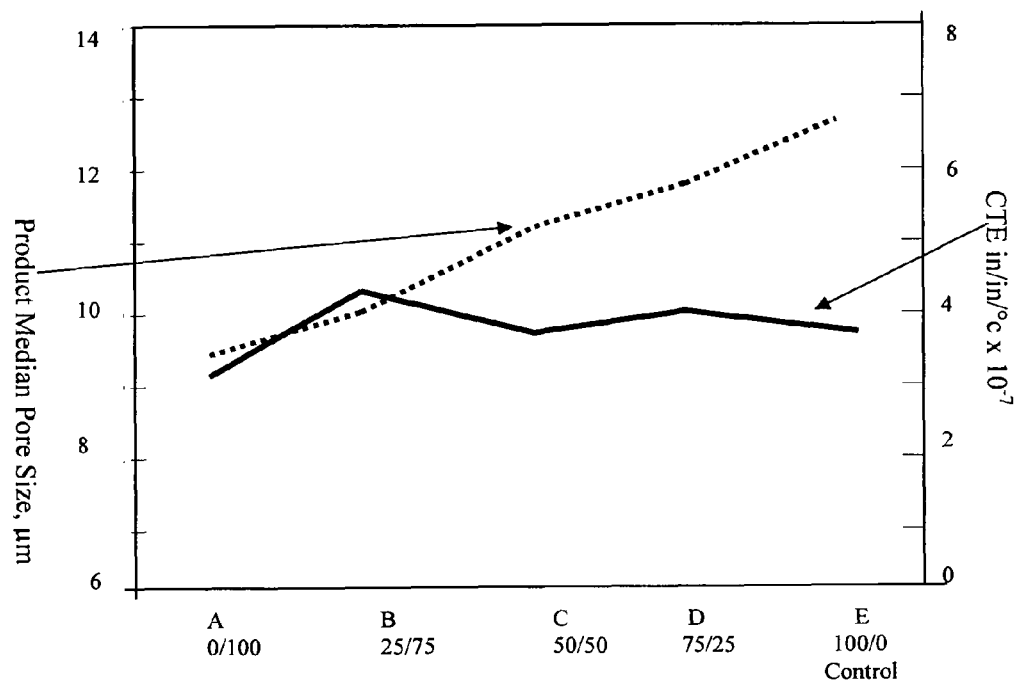
FIG. 1 is a graph illustrating the effect of changing graphite coarse/finer pore former ratios on CTE (coefficient of thermal expansion) and median pore size in a finished honeycomb product.

Herein the term "base" pore former material is identified herein as a "coarse" pore former, and coarser or finer pore forming materials (that is, materials whose average particle size is greater than or less than that of the base pore former) are added to the base (coarse) pore former to adjust the pore size distribution of the honeycomb product. The pore forming materials are combusted during the firing process and are essentially not present in the final product when the firing is completed. Table 1 lists the particle size distribution and median particle size of the coarse and fine graphite pore forming materials, and the potato starch pore forming material, used in the examples given herein.

TABLE 1

| Pore-Forming Material | Particle Size Distribution (μm) | Median Particle Size (MPS, μm) |
|---|---|---|
| Coarse Graphite | Approximately 40-110 | 90 |
| Fine Graphite | Approximately 5-90 | 40 |
| Potato Starch | Approximately 20-100 | 50 |

The method described herein can be used any type of pore forming material, or two or more different pore forming materials, provided that the materials have different particle size distributions.

Examples of ceramic batch material compositions for forming cordierite that can be used in practicing the present disclosure are disclosed in U.S. Pat. Nos. 3,885,977; 4,950,628, RE 38,888; 6,368,992; 6,319,870; 6,210,626; 5,183,608; 5,258,150; 6,432,856; 6,773,657; 6,864,198; and U.S. Patent Application Publication Nos. 2004/0029707, 2004/0261384, and 2005/0046063. Cordierite substrates are formed from inorganic materials including silica, alumina and magnesia that can be supplied in the form of talc, kaolin, aluminum oxide and amorphous silica powders, and may contain other materials as indicated in the cited art. The powders are combined in proportions such as recited in the art as being suitable for forming cordierite substrates.

The inorganic cordierite ceramic-forming ingredients (such as, the silica, talc, clay and alumina supplied as an inorganic powder), an organic binder and a pore forming agent may be mixed together with a liquid to form the ceramic precursor batch. The liquid may provide a medium for the binder to dissolve in, thus providing plasticity to the batch and wetting of the powders. The liquid may be aqueous based, which may normally be water or water-miscible solvents, or organically based. Aqueous based liquids can provide hydration of the binder and powder particles. In some embodiments the amount of liquid is added as a super-addition and is from about 20% by weight to about 50% by weight of the inorganic ceramic-forming powder. Batch materials include the ceramic-forming inorganic materials, organic binder(s) and a pore forming agent; and may additionally include lubricants and selected liquids as described herein and as known in the art.

Examples of ceramic batch material compositions for forming aluminum titanate and derivatives (for example without limitation, mullite aluminum titanate and strontium feldspar aluminum titanate) that that can be used in practicing the present disclosure are those disclosed in U.S. Pat. Nos. 4,483,944, 4,855,265, 5,290,739, 6,620,751, 6,942,713, 6,849,181, 7,001,861, 7,259,120, 7,294,164; U.S. Patent Application Publication Nos.: 2004/0020846 and 2004/0092381; and in PCT Application Publication Nos. WO 2006/015240; WO 2005/046840; and WO 2004/011386. The foregoing patents and patent publications disclose aluminum titanate substrates of varying composition, all of which can be used in practicing the present disclosure. The compositions disclose different aluminum titanate substrates formed from the inorganic materials alumina and titania, and may optionally further contain one or a plurality of silica, a rare earth oxide, an alkaline earth metal oxide and iron oxide. These optional materials may be combined in the proportions recited in the above art as being suitable for forming the various additional aluminum titanate containing substrates. Herein, the inorganic materials used for making an alumina titanate substrate are referred to as an "inorganic ceramic forming powder. Batch materials include the ceramic-forming inorganic materials, organic binder(s) and a pore forming agent; and may additionally include lubricants and selected liquids as described herein and as known in the art.

The inorganic aluminum titanate ceramic-forming ingredients (for example without limitation, alumina, titania and other materials as indicated herein and in the cited art), the organic binder and the pore forming agent may be mixed together with a liquid to form the ceramic-forming precursor batch. The liquid may provide a medium for the binder to dissolve in, thus providing plasticity to the batch and wetting of the powders. The liquid may be aqueous based, which may normally be water or water-miscible solvents, or organically based. Aqueous based liquids can provide hydration of the binder and powder particles. In some embodiments the amount of liquid is from about 20% by weight to about 50% by weight of the inorganic ceramic-forming materials.

The organic binder may be any binder known in the art for producing ceramic articles. In an exemplary embodiment, the binder may be a cellulose ether binder such as, but not limited to, methylcellulose, ethylhydroxy ethylcellulose, hydroxybutyl methylcellulose, hydroxymethylcellulose, hydroxypropyl methylcellulose, hydroxyethyl methylcellulose, hydroxybutylcellulose, hydroxyethylcellulose, hydroxypropylcellulose, sodium carboxymethylcellulose, and mixtures thereof. The properties of preferred cellulose-based binders such as methylcellulose may be water retention, water solubility, surface activity or wetting ability, thickening of the mixture, providing wet and dry green strength to the green bodies, thermal gelation and hydrophobic association in an aqueous environment.

Optionally, other additives such as surfactants and oil lubricants may be super-added to the inorganic ceramic-forming ingredients to facilitate the manufacturing process. Non-limiting examples of surfactants that may be used in the practice of the present disclosure are $C_8$ to $C_{22}$ fatty acids and/or their derivatives. Additional surfactant components that may be used with these fatty acids are $C_8$ to $C_{22}$ fatty esters, $C_8$ to $C_{22}$ fatty alcohols, and combinations of these. Exemplary surfactants are stearic, lauric, oleic, linoleic, palmitoleic acids, and their derivatives, stearic acid in combination with ammonium lauryl sulfate, and combinations of all of these. In an illustrative embodiment, the surfactant may be lauric acid, stearic acid, oleic acid, or combinations of these. The amount of surfactants may be from about 0.5% by weight to about 2% by weight based on the weight of inorganic ceramic-forming ingredients.

Non-limiting examples of lubricants may be light mineral oil, corn oil, high molecular weight polybutenes, polyol esters, a blend of light mineral oil and wax emulsion, a blend of paraffin wax in corn oil, and combinations of these. Typically, the amount of oil lubricants may be from about 1% by weight to about 10% by weight of the inorganic ceramic-forming materials. In an exemplary embodiment, the oil lubricants may be present from about 3% by weight to about 6% by weight.

Non-limiting examples of pore forming agents include graphite, activated carbon, a foamed resin such as an acrylic or acrylate bead, wheat flour, starch (for example, potato starch), a phenolic resin, and other pore forming agents known in the art.

In some embodiments the disclosure are directed to a method of making a honeycomb substrate, for example without limitation, a cordierite or aluminum titanate substrate that can be used as a diesel filter, with near uniform porosity metrics over time, and to a honeycomb substrate having such near uniform porosity metrics. In order to achieve such porosity, the as-batched composition used to make the honeycomb substrate may use two or more pore formers of differing particle size distribution in a selected ratio that is chosen to adjust for changing characteristics of a single pore former over time or the characteristics of other batch ingredients that have an effect on the pore size distribution of the final product. In order to reduce complexity it is preferred to use two or three pore formers, but there is nothing to prevent the use of a greater number of pore formers. As an example, when two pore formers are used the pore formers can either be (1) of the same material with differing particle size, or (2) of differing materials having differing particle size. In another example the method can be extended to using three pore formers, with one ratio being a coarse pore size adjustment, and the other ratio being a fine adjustment. In this case, the three pore formers can be of the same material with differing particle sizes or particle size distribution, or the pore formers can be two or three differing materials, each material having a different particle size or particle distribution, or differing particle morphology. A greater number of pore formers can also be used in practicing the disclosure.

The method can also include changing the particle size of other batch ingredients which are used not only for the purpose of forming pores, but also for other purposes for example, for forming a ceramic microstructure such the cordierite crystal structure; for example, using two different particle size talcs or silicas.

The trigger point for a change in the ratios of two or more pore formers can be based on resulting physical property measurements-from the production process, using an accelerated firing process to obtain faster results than can be obtained from using data from a production formed product, using a laboratory scale material preview process to obtain the needed data, or using a predictive algorithm based on raw material and process attributes.

A filter with consistently uniform porosity over time allows for a more predictably performing product in coating (a washcoat and/or catalytic metals when such metals are used) and on an actual engine in field use or testing. Natural variation does and will continue to exist in mined raw materials used to make the cellular ceramic. This natural variation can cause variations in the resulting product porosity. While controlling the raw materials to the point where any change is negligible in effect on the final product is desirable, this may not be possible due to lack of equipment capability at the vendor, lack of consistent feedstock over time, prohibitive cost, or lack of understanding of all raw material changes that can affect final product properties. However, by using two or more pore formers with enough difference in particle size or particle size distribution, and changing the ratios of these pore formers, it has been found that one can change the pore size distribution of the final product sufficiently to compensate for the effect of natural variation in the batched materials.

By way of an example, the prior art of using a 20% super-addition of a coarse graphite pore former [median particle size ("MPS") of 90 microns] to a cordierite composition talc, clay, silica, and alumina (and optionally additional materials such as plasticizer, lubricants, and other materials as is known in the art) containing composition to make porous cellular ceramic structures resulted in product porosity variability over time as attributes of the batch constituent raw materials change.

FIG. 1 illustrates that when, in accordance with the disclosure, a finer graphite pore former ("F", MPS of 40 μm) is substituted for a fraction of a coarse graphite pore former ("C", MPS of 90 μm). the resulting product pore size can be reduced as is shown in FIG. 1. In FIG. 1 the total pore forming material is a 20 wt % super-addition based on the total inorganic ceramic-forming materials. Adjustments to the final product median (pore) size can be made by reducing or increasing the level of one particle size pore former relative to a different particle size pore former; that is changing the C/F ratio. FIG. 1 illustrates what happens to median pore size and CTE (the coefficient of thermal expansion of the fired product, measured at temperature range of 25 C to 800° C.) as the ratio of coarse/finer graphite pore forming particles is changed from 0/100 coarse/finer to 100/0 coarse/finer (the ratios are represented on the vertical axis by letters A to E, respectively). FIG. 1 shows that the median pore size increases as the amount of coarse particles increases. However, the CTE remains relatively constant as the coarse/finer pore former ratio changes.

Figure 2:
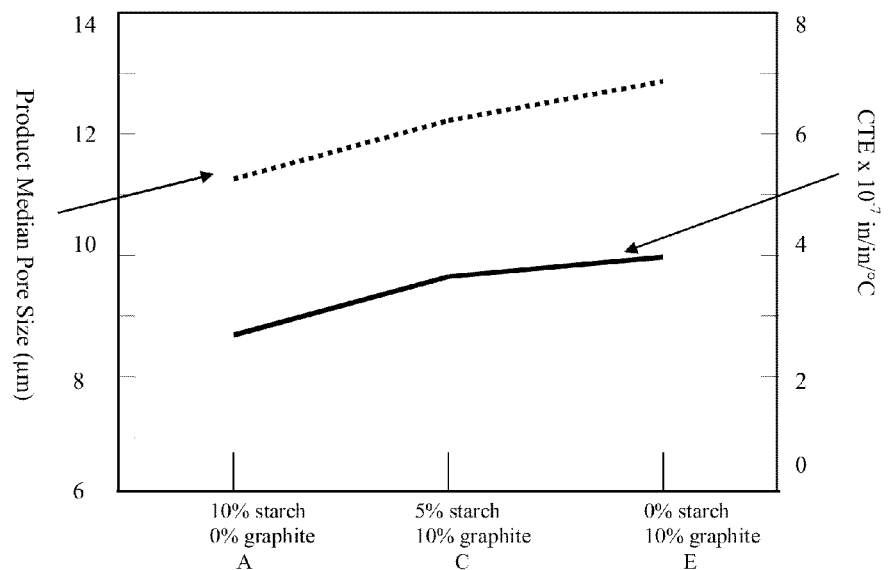
FIG. 2 is a graph illustrating the effect of using coarse graphite and finer potato starch as pore formers on CTE and median pore size in a finished honeycomb product.

A similar result can be attained using different pore former materials (for example, graphite and potato starch), as long as they are sufficiently different in particle size as is illustrated in FIG. 2. In FIG. 2, the ratio of coarse graphite to potato starch (a finer particle size material) was changed. Samples were prepared from batches in which the starch/graphite pore former ratio varied (super-addition in batch wt. % of inorganic ceramic-forming materials)) from 10/0 to 5/10 to 0/10 (represented by A, C and E, respectively on the horizontal axis). It was found that as the amount of coarse graphite increases the median pore size increased. The fact that the 5/10 batch product has a smaller median pose size than the 0/10 product illustrates that the use of a finer pore former can reduce the median pore diameter. While the difference between the CTE values (measured at the temperature range of 25 C to 800° C.) illustrated in FIG. 2 are small, it is always necessary make certain that when two different materials are used as pore forming agents the final product CTE remains within targeted levels.

Figure 3:
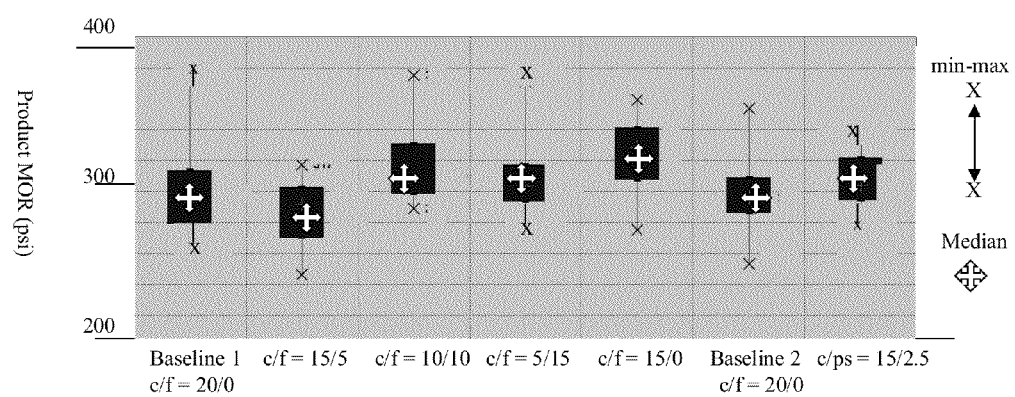
FIG. 3 is a box plot illustrating the influence of changing coarse/finer graphite and coarse graphite/finer potato starch on the modulus of rupture of a honeycomb product.
Figure 4:
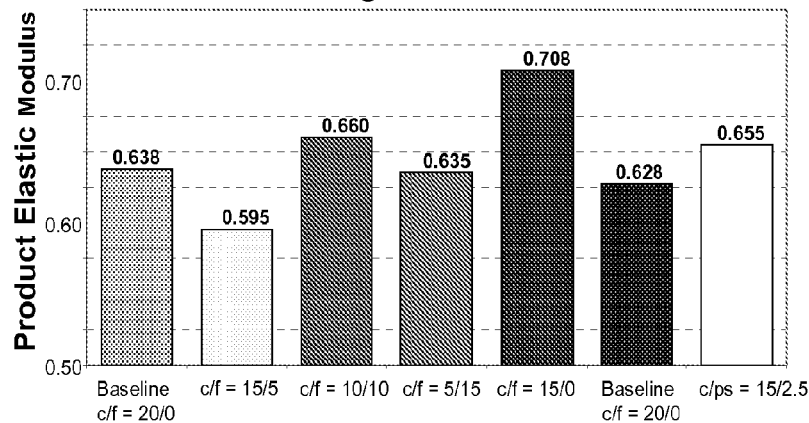
FIG. 4 is a box plot illustrating the influence of changing coarse/finer graphite and coarse graphite/finer potato starch on the elastic modulus of a finished honeycomb product.
Figure 5:
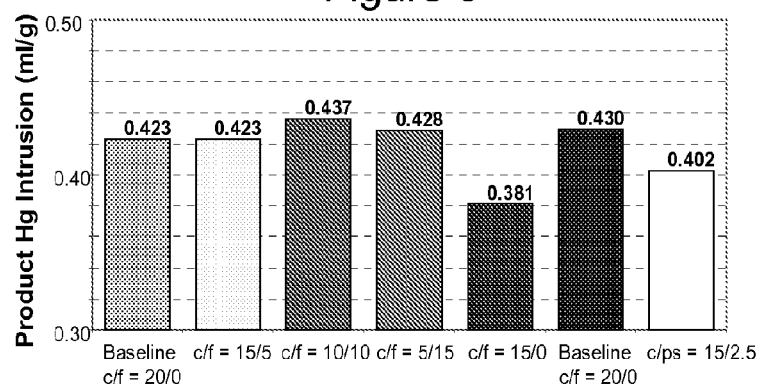
FIG. 5 is a box plot illustrating the influence of changing coarse/finer graphite and coarse graphite/finer potato starch on total Hg Intrusion (a porosity measurement) of a honeycomb product
Figure 6:
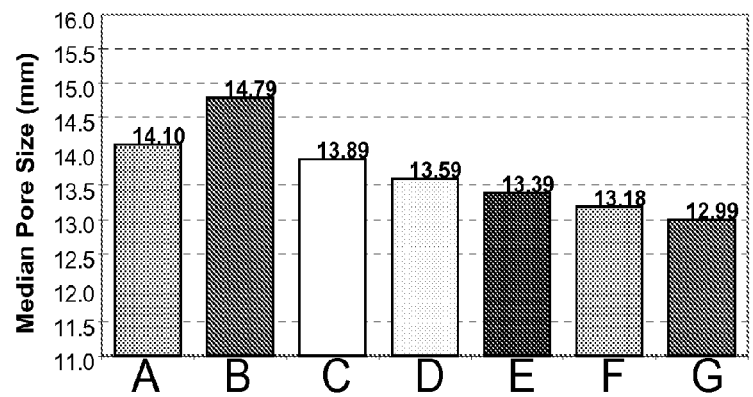
FIG. 6 is a graph illustrating the pore size distribution of commercial product, a coarse graphite (only) product and a product made with a 15/5 coarse/finer graphite pore former.

FIGS. 3-6 illustrate that changing the ratio of different particle size carbon-based pore forming batch ingredients results in little variation in other product properties such as the modulus of rupture ("MOR", a measure of product physical strength, FIG. 3); elastic modulus ("EMOD", a measure of a substance's tendency to be deformed elastically (that is, non-permanently) when a force is applied to it, FIG. 4); Total Hg intrusion (a measure of porosity, FIG. 5; and other factors such as median pore size (FIG. 6). Total Hg Intrusion and D-Factor remained relatively steady. D-Factor is a ratio of the percentage of particles having a first selected pore size "x" and the percentage of particles having a second selected particle size "y', and is generally written as $(D_x-D_y) \div D_x$. For example, in the expression $(D_{50}-D_{10}) \div D_{50}$, $D_{50}$ is the median pore size (the 50 percent value) and $D_{10}$ is the pore size at the 10 percent value. Using the method described herein one can move the median pore size without affecting the other properties as mentioned above. In FIGS. 3-5 all "c/f" and "c/ps" values are as a super-addition in wt. % of the inorganic ceramic-forming materials as batched.

FIG. 3 illustrates the Modulus of Rupture ("MOR") as a function of coarse/finer ("c/f") graphite and/or coarse graphite/potato starch ("c/ps"), in weight percent, used in preparing the product batch. The baselines products were prepared from two different batches of the same product in which 20 wt. % coarse graphite was used as the pore former (c/f=20/0). FIG. 3 illustrates that the MOR remains stable with varying ratios of coarse and finer graphite. Substitution of 2.5% potato starch for 5% of the coarse graphite (that is, the sample labeled c/ps=15/2.5) yields a product whose MOR is also similar to that of the baseline product. The maximum, minimum and median MOR values are as indicated in the vertical box on the left. In FIGS. 3-5 all "c/f and c/ps" values are in wt. % of the product as batched.

FIG. 4 illustrates EMOD as a function of coarse/finer ("c/f") graphite and coarse graphite/potato starch ("c/ps"), in weight percent, used in preparing the product batch. The products prepared from two different batches of the same product in which 20 wt. % coarse graphite was used as the pore former (c/f=20/0). FIG. 4 illustrates that the EMOD remains relatively stable with varying ratios of coarse and finer graphite. The coarse graphite/potato starch product (c/ps=15/2.5; substitution of 2.5% potato starch for 5% of the coarse graphite) yields a product whose EMOD is also similar to that of the baseline product. The numerical values in the illustration are the average EMOD value for each sample.

FIG. 5 illustrates Total Hg Intrusion, a measure of porosity, as a function of coarse/finer ("c/f") graphite and coarse graphite/potato starch ("c/ps"), in weight percent, used is preparing the product batch. The products prepared from two different batches of the same formulation in which 20 wt. % coarse graphite super-addition was used as the pore former (c/f=20/0). FIG. 5 illustrates that Hg Intrusion remains stable with varying ratios of coarse and finer graphite. The coarse graphite/potato starch product (c/ps=15/2.5, substitution of 2.5% potato starch for 5% of the coarse graphite) yields a product that has a slight reduction in porosity which can be corrected by the use of an additional amount of potato starch (approximately 1-3 wt. %). The numerical values in the illustration are the average Total Hg Intrusion value for each sample.

Figure 7:
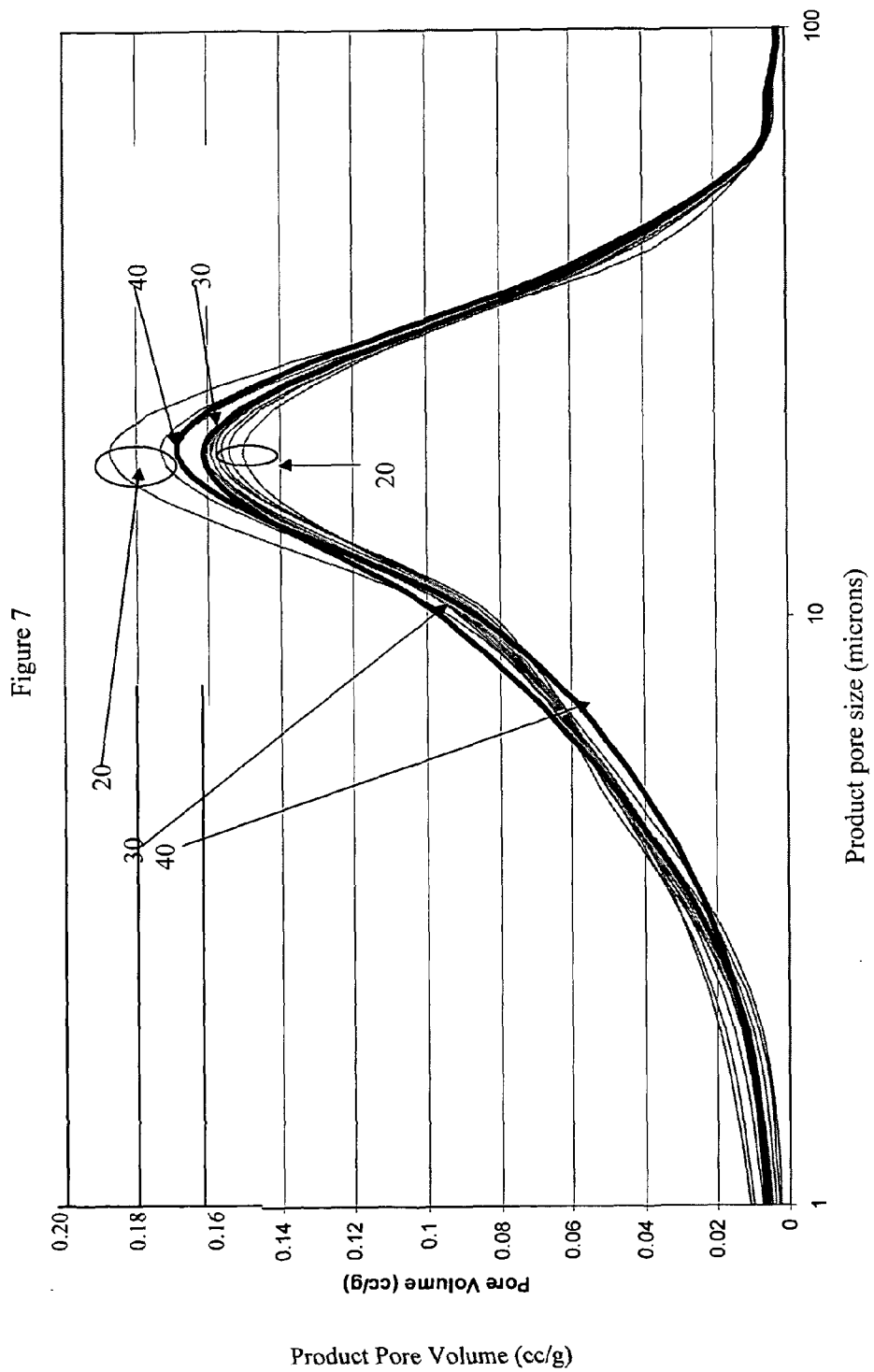
FIG. 7 is a bar chart illustrating a coarse adjustment using potato starch and additional fine adjustments using finer graphite for a 3 pore former system.

FIG. 7 is a graph illustrating the relationship between honeycomb pore volume and pore size for typical commercially produced honeycomb products made using commercially available pore formers, a honeycomb made using only a coarse pore former, and a honeycomb made using a both a coarse and finer pore former. In FIG. 7, numeral 20 represents the curves (shown in light grey) for commercially available honeycomb cordierite products that have a Median Pore Size ("MPS") of 12.1 microns. The curve 30 represents a cordierite product having an MPS of 12.9 microns which was made using a 20 weight percent super-addition of only coarse graphite described herein as the pore forming material. Curve 40 represents a cordierite product that has a MPS of 12.1 microns that was made using a super-addition pore former blend consisting of 15 weight percent coarse graphite (the same as used to make the product of curve 30) and 5 weight percent finer graphite as described herein. The curves in FIG. 7 illustrate that one can move the pore size distribution from an MPS=12.9 (curve 40) to one having a MPS=12.1 (curve 30) by substituting a finer graphite for part of the coarse graphite. The data indicates that when a pore forming material has a high coarse particle content, the addition of a finer pore former to the batch can be used to adjust the pore size distribution in the product and obtain the desired MPS. The reverse is also true. If a pore forming material has a higher finer particle content then desired, the addition of a coarse pore forming material can be to adjust the pore size distribution.

In a further embodiment 3 levels of pore former particle size can be used to control pore size. This embodiment allows targeting moves toward the finer or coarser end of the product pore size distribution. This embodiment also allows one to modify production procedures so that there is an infrequent adjustment to the pore former particle distribution by choosing a first ratio of two of the pore formers, and a more frequent fine-tuning move by ratioing or blending the first ratio of two pore formers with a third pore former or by use of a second combination of the pore formers. An example of the practicality of this second approach would be in choosing a ratio of coarse graphite and potato starch to create a different pore structure for product A than for product B, both products being fired on the same firing schedule. Fine adjustments could be made with changing ratios of coarse and finer graphite for both products, assuming that both had graphite as a pore former. FIG. 6 is one example of adjustments that can be made using a 3 pore former system. The sample types are given below in Table 2.

TABLE 2

| Sample | Description |
|---|---|
| A | Reference product, MPS 14.1 |
| B | c/ps/f = 20/0/0 |
| C | c/ps/f = 20/2.5/0 |
| D | c/ps/f = 18.5/2.5/1.25 |
| E | c/ps/f = 17.5/2.5/2.5 |
| F | c/ps/f = 15/2.5/5 |
| G | c/ps/f = 12.5/2.5/7.5 |

Samples B-G: same composition as "A" except for the listed pore former variations.
Sample B is the "master batch" baseline material for Samples B-G.
c/ps/f = "coarse graphite/potato starch/fine graphite ratio", wt, % materials, and fine graphite is substituted for coarse graphite In this example, the addition of potato starch ("ps") is used to make the first adjustment to the master batch material B (base material) in order to lower the median pore size to more closely match that of reference material A by creating a different median pore size then for the base case. Subsequently, the ratio of coarse and finer graphite was changed to further adjust the median pore size of the pore former compositions labeled D-G to different levels. FIG. 6 illustrates that, for a 3 pore former system of Table 2, as the finer graphite is substituted for the coarse graphite, the potato starch remaining constant, the median pore responds linearly and the MPS decreases with increasing fine graphite substitution. Use of the above system further illustrates that it is possible to create of a range of products by using a three or more pore forming materials of different particle size distribution and changing ratios and levels of at least two of the pore formers.

As mentioned above, changing the ratio of 2 or more pore formers can be based on physical property measurements during the production process, using an accelerated firing process to obtain faster results from production formed product, using a laboratory scale material preview process to obtain yet faster response time, or using a predictive algorithm based on raw material and process attributes. The first approach has the disadvantage of having the slowest response time for large sized parts where the total manufacturing time could be on the order of weeks. The alternative methods are ways to shorten the time from obtaining results that indicates that a change in pore former ratio is called for and determining how to make that change. With a laboratory scale process, batches of materials can be prepared ahead of the time using the same raw materials that are being used to make the commercial product. In a further embodiment, in the laboratory scale process dimensionally smaller size product samples can be made and fired from green body to final product. Dimensionally smaller samples enable one to fire the green body using the same temperature profile as is commercially used, but for a shorter period of time due to the smaller dimensions of the samples Consequently, it is possible to make a real-time adjustment in the commercial manufacturing process using a laboratory scale method.

The pore size distribution in a honeycomb product is the result of all the materials that are used in making the product. At times the pore size distribution can change because the particle size distribution of one or more of the materials used in making the product (talc, binder and inorganic materials as well as pore forming agent)) has changed which can cause the pore size distribution in the product to vary. Adjusting the pore former in the blend used to make the product by addition of a finer or coarser pore former, as the case may be, will bring the product back to the desired value. Using a ratio of pore forming materials allows one to adjust just the primary pore forming agents instead of having to carry out a time consuming and expensive analysis of all materials to determine the cause of the variation. As a result, the method described allows one to obtain a desired result in median pore diameter in a honeycomb substrate without materially affecting other important parameters such as CTE, MOR, E-mod, total intrusion and the D-Factor. Using the method described herein one can obtain the desired median pore size without affecting the other properties as mentioned above.

Thus, a method for manufacturing porous ceramic articles is described that comprises introducing a first mixture of a plurality of ceramic-forming materials into an extruder, the first mixture comprising a first pore forming powder (in wt % A) with a first pore former particle size distribution, a first amount of a second pore forming powder (in wt % B) with a second pore former particle size distribution, and a first amount of a first type of inorganic ceramic-forming powder (in wt % C) having a powder particle size distribution, wherein the first and second pore forming powders are present in a first weight ratio (wt % A/wt % B) in the first mixture, and the first and second particle size distributions differ from each other; introducing the first mixture into an extruder; extruding at least a portion of the first mixture into a first extrudate; firing at least a portion of the first extrudate to form a first porous ceramic body; measuring the pore size distribution of the first porous ceramic body and if the pore size distribution needs adjustment, then modifying the first mixture by providing the first and second pore forming powders in respective amounts (wt % D, wt % E) to result in a second weight ratio (wt % D/wt % E) which is different from the first weight ratio, and adding and mixing the pore formers in the ratio wt % D/WT % E to the first inorganic ceramic forming powder to form a second mixture; introducing the second mixture into the extruder; extruding at least a portion of the second mixture into a second extrudate; firing at least a portion of the second extrudate to form a second porous ceramic body; and measuring the pore size distribution of the second porous ceramic body to determine the pore size distribution. Using the foregoing method the CTE, MOR, EMOD, D-factor and total porosity of the first and second ceramic bodies can be substantially unchanged relative to one another. Other materials such as binders, lubricants and liquids (for example, water) may be present in the batch composition that is extruded.

The first type of inorganic ceramic-forming powder is selected from the group consisting of a cordierite forming inorganic powder and an aluminum titanate forming powder that are used to form cordierite and aluminum titanate substrate, respectively. The types of inorganic materials used to make cordierite and aluminum titanate substrates as indicated above, the references therein and other references that would be known to one skilled in the art. The method of controlling pore size and distribution as taught herein can also be used to make porous mullite ceramic bodies such as is taught in U.S. Pat. No. 6,238,618 whose teaching are incorporated herein by reference. The mullite ceramic bodies are formed from an inorganic powder contain silica ($SiO_2$), alumina ($Al_2O_3$) and a water-swelling clay (a source of magnesia—MgO), a binder (for example without limitation a cellulose ether binder selected from the group consisting of methylcellulose and methyl cellulose derivatives such as hydroxymethyl cellulose), and other substance as taught in U.S. Pat. No. 6,238, 618. The silica and alumina can be mixed and calcined to form mullite that is then powdered. The mullite powder is then mixed with a water swelling clay (for example without limitation, a bentonite-type montmorillonite clay) and water, and the resulting combination is intimately mixed. A binder, a surfactant (for example without limitation, stearic acid or sodium stearate) and water are then added to the mullite-clay mixture and thoroughly mixed in to form a mullite batch mixture that can be shaped into a green body by any conventional ceramic forming process (for example, extrusion, pressure casting, injection molding, etc) and fired to form a mullite ceramic material.

In the manufacturing method the total porosity of the first porous ceramic body is measured and, if required, a second mixture of pore formers, wt % D/wt % E, is added to the inorganic materials of the first mixture of to form a second mixture of batch materials that is then extruded and fired to form a second porous ceramic body. The pore size distribution of the second porous ceramic body is determined and, if the distribution is with the desired limits, extrusion continues. In addition, if the particle size distribution of the first inorganic powder has changed, the change in particle size distribution of the inorganic powder can be used to determine the second weight ratio, wt % D/wt % E. In the event that the pore size distribution of the fired second porous ceramic body is still outside the targeted pore size distribution after addition of the second mixture, the a further addition of pore formers in a selected weight ratio, and also the inorganic powder if needed, can be made. The first and second pore forming powders are selected from the group consisting of graphite, activated carbon, a starch, a foamed resin, an acrylic bead, a methacrylate bead, a flour, and a phenolic resin. In one embodiment the first and second pore forming powders are selected from the group consisting of graphite and potato starch.

Also described herein is a method for controlling the pore size in honeycomb substrates without substantially changing the CTE, MOR, E-MOD, Total Intrusion and D-Factor. The method comprises batching selected ingredients to form material batch suitable for forming a selected honeycomb substrate; forming a green body from said batch materials; and firing said green body to form a honeycomb substrate; wherein said batch contains a carbon based base pore forming material having a selected particle size distribution and at least one additional pore forming material having a different particle size distribution to control the pore size distribution in the honeycomb substrate, said selected base pore forming material and the at least one additional pore forming material being added to the batch in a selected ratio. It has been found that the CTE, MOR, EMOD, Total Intrusion and D-Factors of the honeycomb substrate containing the base pore former and the at least one additional pore former are substantially unchanged relative to a honeycomb substrate prepared from the same selected batching ingredients without the presence of the at least one additional pore former. The honeycomb substrates and filters made in accordance with this method are selected from the group consisting of cordierite substrates and aluminum titanate substrates. The cordierite and aluminum titanate honeycomb substrate can be of any composition described herein including the cited references and other reference to cordierite and aluminum titanate substrates that are known to one The method disclosed herein can also be used to produce mullite The pore forming materials are selected from the group consisting of graphite, activated carbon, a foamed resin, an acrylic bead, a methacrylate bead, wheat flour, starch, a phenolic resin, and other pore forming agents known in the art. In a particular embodiment the pore forming materials are selected from the group consisting of graphite and potato starch. In one embodiment of the method of controlling pore size the batch contains two pore formers of different particle sizes, said pore formers being graphite pore formers; the first or base pore former being a coarse particle pore former having a selected particle size distribution and the second pore former being either a finer particle pore former consisting of smaller particles than the base core former or a pore former than the base pore former depending on the particle side distribution of the base core former. In another embodiment of the method of controlling pore size the batch contains three pore formers of different particle size, said pore formers being graphite pore formers; the first or base pore former being a coarse particle pore former having a selected particle size distribution, the second pore former being a finer particle pore former consisting of smaller particles than the base core former, and the third pore form being coarser pore former consisting of larger particles than the base pore former.

Figure 8:
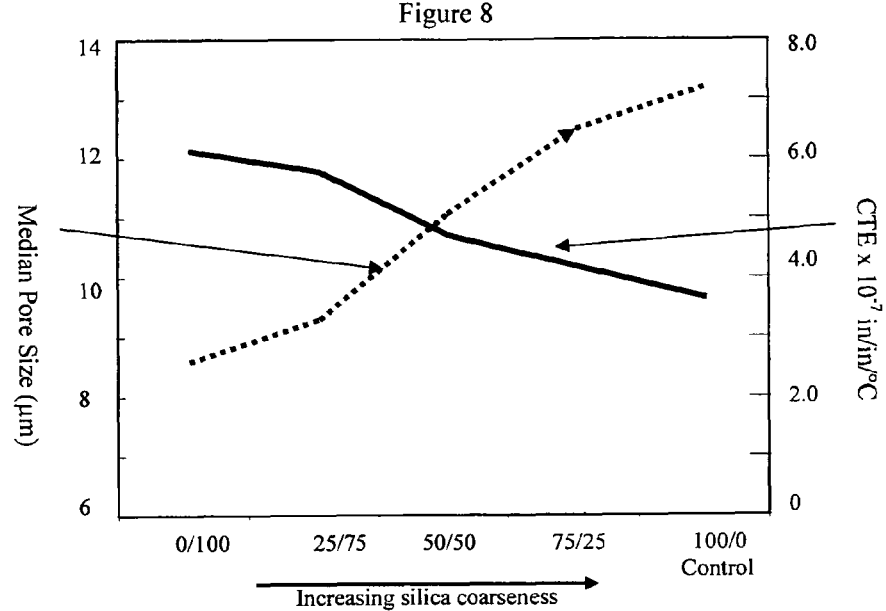
FIG. 8 is a graph illustrating the effect of using different ratios of coarse and finer silica on CTE and median pore size of a honeycomb product.
Figure 9:
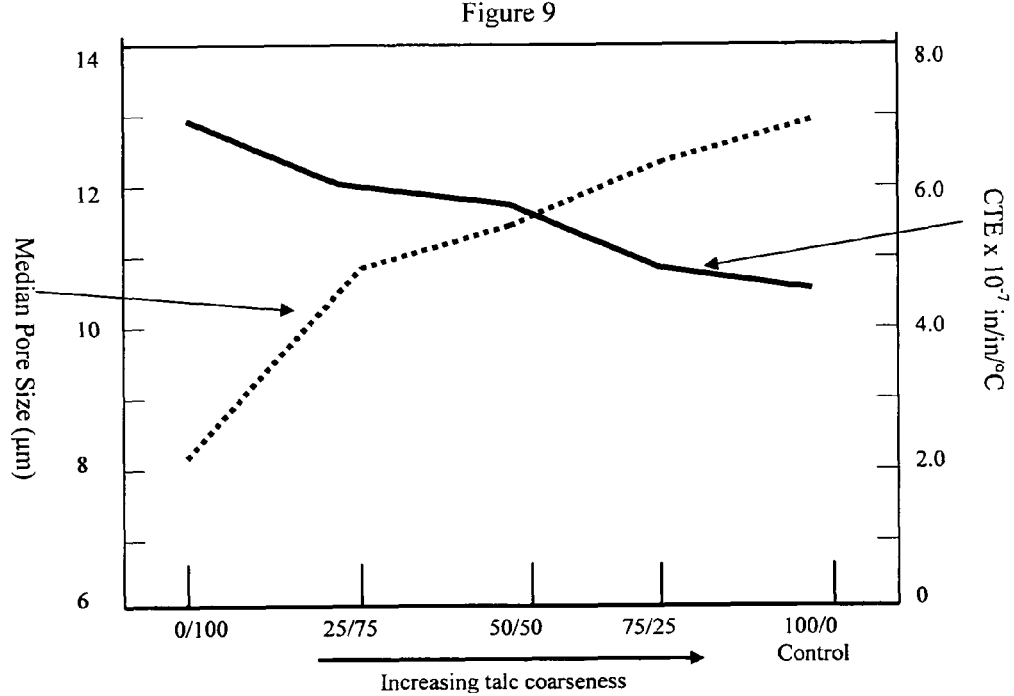
FIG. 9 is a graph illustrating the effect of different rations of coarse and fine talc on CTE and median pore size of a honeycomb product.

In one embodiment of the disclosure the use of different particle size materials can be extended to managing the ratios of each of multiple batch ingredients including, at the extreme, each component in the batch. This embodiment provides the advantage of managing the pore size variation in the final product such that it is in the exact region required for each individual product batch. However, one needs to be careful that this approach does not drive other important product properties in an undesired direction. As an example, FIGS. 8 and 9 illustrate the effect of changing the particle size of silica and talc, respectively. Table 3 gives the particle size distribution for the coarse and fine silica and talc used in FIGS. 8 and 9, respectively.

TABLE 3

| Material | Particle Size Distribution (µm) | Median Particle Size (MPS, µm) |
| --- | --- | --- |
| Coarse Silica | Approximately 1-60 | Approximately 15 |
| Fine Silica | Approximately 1-20 | Approximately 4 |
| Coarse Talc | Approximately 2-60 | Approximately 15 |
| Fine Talc | Approximately 0.7-10 | Approximately 2 |

While in both cases the changes to the silica and talc particle size had a strong impact on product median pore size in the fired product, they also had an impact on the product CTE that could be undesirable. FIG. 3 in which the ratio of coarse-to-fine silica is changed, shows a strong linear median pore size response (dotted line) response and also a strong linear CTE response (solid line). The 100/0 coarse silica or talc is the "Control" for the respective material. As the silica coarseness increases the median pore size increases and the CTE decreases. FIG. 4 shows a similar result when the ratio of coarse-to-fine talc is changed, there being a strong linear median pore size response (dotted line) response and also a strong linear CTE response (solid line), the CTE decreasing as the median pore size increases with increasing talc coarseness. Using the method described herein in detail for adjusting pore forming agents, the CTE can be adjusted by using a ratio of fine and coarse silica or talc to make a correction for raw materials that have a higher or lower particle size distribution than is normally used for making a product.

It will be apparent to those skilled in the art that various modifications and variations can be made to the present disclosure without departing from the spirit and scope of the disclosure. Thus it is intended that the present disclosure covers the modifications and variations of this disclosure provided they come within the scope of the appended claims and their equivalents.

We claim:

1. A method of manufacturing porous ceramic articles and controlling the pore size distribution of the articles to meet a targeted pore size distribution, the method comprising:
   (a) introducing a first mixture of a plurality of ceramic-forming materials into an extruder, the first mixture comprising:
      a first amount of a first pore forming powder (in wt % A) with a first pore former particle size distribution,
      a first amount of a second pore forming powder (in wt % B) with a second pore former particle size distribution, and
      a first amount of a first type of inorganic ceramic-forming powder (in wt % C) having a powder particle size distribution,
      wherein the first and second pore forming powders are present in a first weight ratio (wt % A/wt % B) in the first mixture, and
      further wherein the first and second pore former particle size distributions differ from each other;
   (b) extruding at least a portion of the first mixture into a first extrudate,
   (c) firing at least a portion of the first extrudate to form a first porous ceramic body, and
   (d) measuring a pore size distribution of the first porous ceramic body and adjusting a pore size distribution of a second porous ceramic body to meet a targeted pore size distribution,
      wherein adjusting the pore size distribution is done by:
         (i) modifying the first mixture by providing the first and second pore forming powders in respective amounts (wt % D, wt % E) to result in a second weight ratio (wt % D/wt % E) which is different from the first weight ratio, and adding and mixing the first and second pore forming powders in the ratio wt % D/wt % E to the first type of inorganic ceramic forming powder to form a second mixture,
         (ii) introducing the second mixture into the extruder,
         (iii) extruding at least a portion of the second mixture into a second extrudate,
         (iv) firing at least a portion of the second extrudate to form the second porous ceramic body, and
         (v) measuring a pore size distribution of the second porous ceramic body to determine the adjusted pore size distribution;
   wherein the first and second porous ceramic bodies have a CTE, an MOR, D-Factor and an EMOD, and the CTE, MOR, D-Factor and EMOD of the first and second porous ceramic bodies is substantially the same.

2. The method of claim 1 wherein the total porosity of the first and second porous ceramic bodies are substantially the same.

3. The method of claim 1 wherein the first type of inorganic ceramic-forming powder is selected from the group consisting of a cordierite forming inorganic powder and an aluminum titanate forming inorganic powder.

4. The method of claim 1 wherein the second weight ratio is determined from the pore size distribution of the first porous ceramic body relative to the targeted pore size distribution.

5. The method of claim 1 wherein the second weight ratio is determined based on the powder particle size distribution of the first type of inorganic ceramic-forming powder.

6. The method of claim 1 wherein the second weight ratio is determined in response to a change in a measured physical property.

7. The method of claim 1, wherein if the pore size distribution of the second porous ceramic body does not meet the targeted pore size distribution, the method further comprises:
(e) adding a selected weight percent of a third pore forming agent to the second mixture, the third pore forming agent having a different particle size distribution than the first and second pore forming agents,
(f) mixing the second mixture and third pore forming agent to form a third mixture,
(g) extruding a least a portion of the third mixture into a third extrudate,
(h) firing at least a portion of the third extrudate to form a third porous ceramic body, and
(i) measuring a pore size distribution of the third porous ceramic body to determine the pore size distribution.

8. The method of claim 1, wherein the first and second pore forming powders are selected from the group consisting of graphite, activated carbon, a starch, a foamed resin, an acrylic bead, a methacrylate bead, a flour, and a phenolic resin.

9. The method of claim 7, wherein the third pore forming agent is selected from the group consisting of graphite, activated carbon, a starch, a foamed resin, an acrylic bead, a methacrylate bead, a flour, and a phenolic resin.

10. The method according to claim 1, wherein the first and second pore forming powders are selected from the group consisting of graphite and potato starch.

11. A method for controlling the pore size distribution in honeycomb substrates without substantially changing the CTE, MOR, E-MOD, Total Intrusion and D-Factors, said method comprising:
(a) batching selected ingredients to form a first batch material suitable for forming a honeycomb substrate,
(b) forming a first green body from said first batch material, and
(c) firing said first green body to form a first honeycomb substrate,
(d) batching selected ingredients to form a second batch material suitable for forming a honeycomb substrate,
(e) forming a second green body from said second batch material, and
(f) firing said second green body to form a second honeycomb substrate,
wherein said first batch material contains a carbon based base pore forming material having a selected particle size distribution and at least one additional pore forming material having a different particle size distribution to control a pore size distribution in the first honeycomb substrate, said carbon based base pore forming material and the at least one additional pore forming material being added to the first batch material in a selected ratio;
wherein the CTE, MOR, EMOD, Total Intrusion and D-Factor of the first honeycomb substrate containing the carbon based base pore forming material and the at least one additional pore forming material is substantially unchanged relative to the second honeycomb substrate prepared from the second batch material;
wherein the second batch material comprises the selected ingredients in substantially the same amounts as the first batch material with the exception of the at least one additional pore forming material, which is not present; and
wherein the second honeycomb substrate is formed and fired under substantially the same conditions as the first honeycomb substrate.

12. The method according to claim 11, wherein the pore forming materials are selected from the group consisting of graphite, activated carbon, a foamed resin, an acrylic bead, a methacrylate bead, wheat flour, starch, and a phenolic resin.

13. The method according to claim 11, wherein the pore forming materials are selected from the group consisting of graphite and potato starch.

14. The method according to claim 11, wherein the honeycomb substrates are cordierite substrates.

15. The method according to claim 11, wherein the honeycomb substrates are aluminum titanate substrates.

* * * * *